Jan. 24, 1956
W. R. HENDRY
2,731,839
TACHOGRAPH ADAPTERS FOR GASOLINE ENGINES
Filed Aug. 18, 1952
2 Sheets-Sheet 1
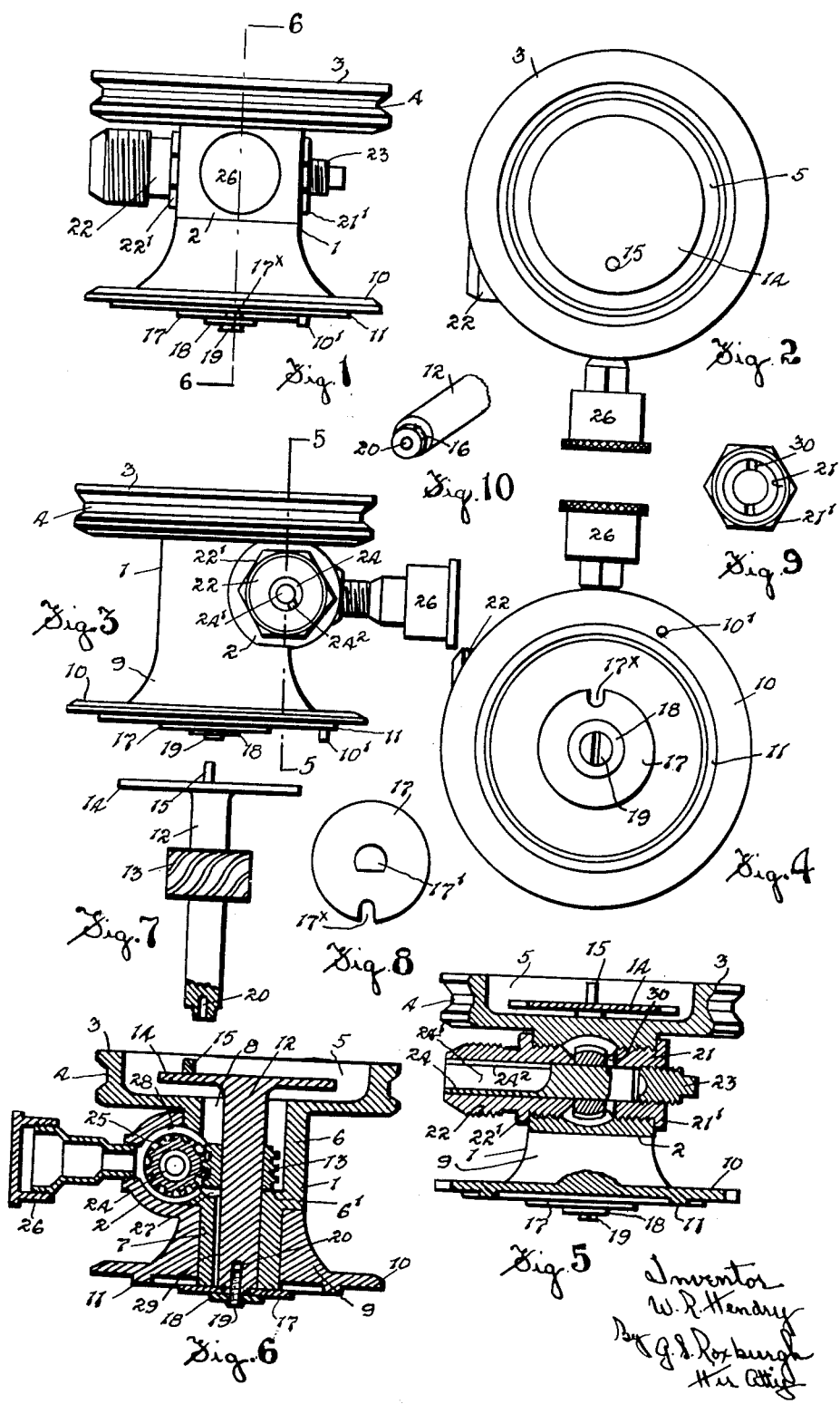

Jan. 24, 1956    W. R. HENDRY    2,731,839
TACHOGRAPH ADAPTERS FOR GASOLINE ENGINES
Filed Aug. 18, 1952    2 Sheets-Sheet 2
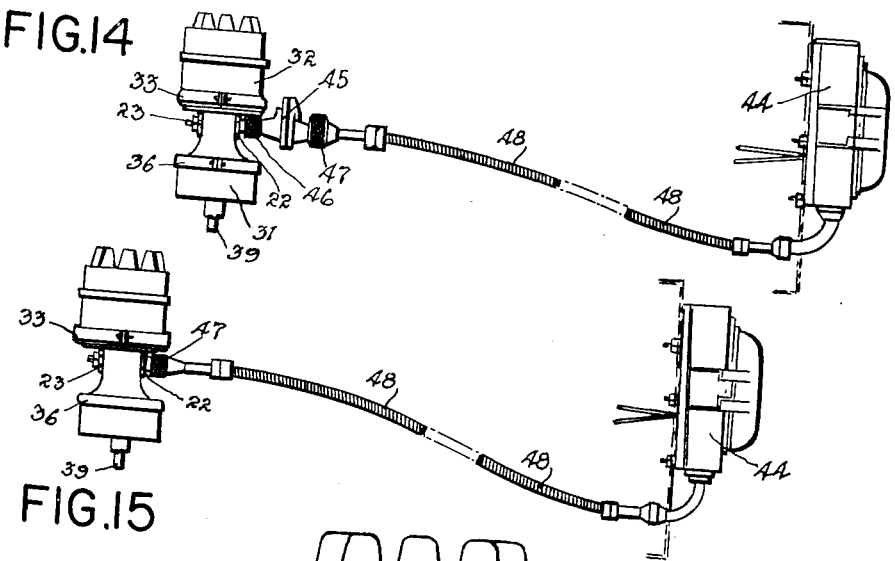
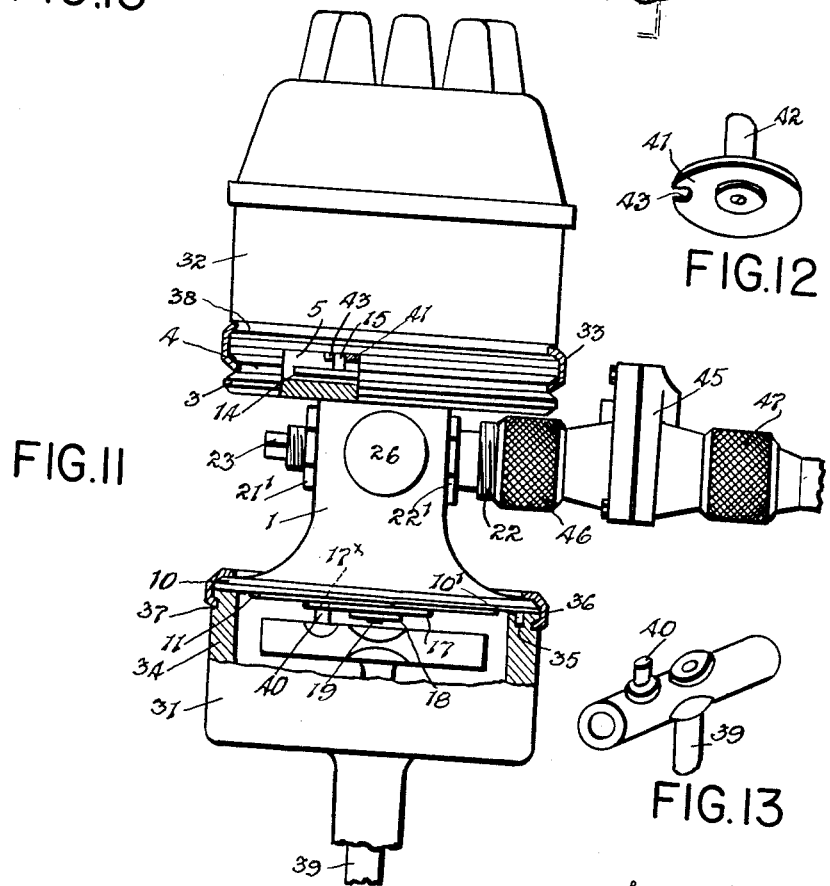
Inventor
W. R. Hendry
By J. S. Roxburgh
His Atty

United States Patent Office 2,731,839
Patented Jan. 24, 1956

2,731,839
TACHOGRAPH ADAPTERS FOR GASOLINE ENGINES

William R. Hendry, Calgary, Alberta, Canada

Application August 18, 1952, Serial No. 305,029

1 Claim. (Cl. 74—15.8)

The invention relates to an adapter for introduction between the governor and the distributor of a Ford gasoline engine such as used on four and five ton trucks and with the general object of utilizing the adapter to drive a tachograph at its required speed.

A further object is to so design the adapter that when introduced, as above, it forms a driving connection between the governor and distributor without requiring any change in their existing structure and provides, also, a driven countershaft which can be coupled up with selected means for driving the tachograph at its correct driven speed.

A further object is to so design the adapter that it can be easily and quickly clamped in place while utilizing the existing clamp receiving channels of the governor and distributor.

A more detailed object is to provide an adapter having a central transmission or coupling shaft provided at its lower end with a slotted disc to receive the existing driving pin of the governor and at its upper end with a disc having an eccentric pin adapted to enter the receiving slot of the existing driving disc of the distributor and to associate with such shaft, a countershaft driven by intermeshed worm gears having a selected gear ratio and which countershaft is used to drive selected driving connections between it and the tachograph.

A further object is to so construct the adapter that all internal working parts can be readily installed or removed and such that ample provision is made for effectively lubricating such working parts.

A further object is to provide the adapter with a grease cup for lubricating purposes and with a screw plug positioned at a selected distance therefrom and which cup and plug are interchangeable in position if installation conditions require such.

A further object is to so design the adapter such that it can be, with a predetermined worm gear ratio, directly coupled up through a flexible driving connection with the existing rotor shaft of a tachograph to drive the latter at its correct driven speed or such that with a 1:1 worm gear ratio, it can be coupled up with an exterior gear case having the correct gear ratio, to drive, through a flexible drive cable, the existing rotor shaft of the tachograph at the latter's correct driven speed.

With the above more important objects and other minor objects in view, which will become apparent as the description proceeds, the invention consists essentially in the arrangement and construction of parts hereinafter described, reference being had to the accompanying drawings, in which:

Fig. 1 is a side view of the adapter.
Fig. 2 is a top plan view of the adapter.
Fig. 3 is a side view, rotated to a position, at right angles to that shown in Fig. 1.
Fig. 4 is an inverted plan view as appearing in Fig. 2.
Fig. 5 is a vertical sectional view at 5—5, Fig. 3.
Fig. 6 is a vertical sectional view at 6—6, Fig. 1.
Fig. 7 is a side view of the transmission or coupling shaft of the adapter.
Fig. 8 is a plan view of the lower rotor or disc of the adapter.
Fig. 9 is an end view of the plug which is fitted with the screw plug.
Fig. 10 is a perspective view of the lower end of the transmission shaft of the adapter.
Fig. 11 is a side view showing the adapter in mounted position between the governor and the distributor, parts being broken away to expose construction.
Fig. 12 is a perspective view of the upper end of the governor driving shaft and showing the eccentric pin carried thereby.
Fig. 13 is a perspective view of the lower end of the distributor operating shaft and showing the slotted disc secured thereto.
Fig. 14 is a side view showing the adapter mounted in operating position between the governor and the distributor and having a gear box connected thereto and in turn, connected by a flexible driving cable to the rotor shaft of the tachograph.
Fig. 15 is a side view similar to Fig. 14, with the gear box omitted and showing the flexible tachograph driving cable secured directly to the adapter counter shaft.

In the drawings like characters of reference indicate corresponding parts in the several figures.

I will first describe the adapter in detail.

It presents a somewhat spool shaped casing 1 which is provided with a horizontally disposed side sleeve 2 and its upper circular head 3 is supplied with a circumscribing exterior channel 4 and with an exterior sunken pocket 5. A sleeve 6 (see Fig. 6) extends downwardly from the pocket and has the lower end contracted to provide an internal shoulder 6' beneath which is a bearing 7 and above which is an open space 8 which opens to the pocket. The casing also provides a lower member 9 permanently secured to the sleeve 6 and which is formed to provide the side sleeve 2, and a bottom disclike base 10, the latter being supplied on its underside with a circular rib 11 concentric to the sleeve 6 and with a selectively placed pin 10'. A central spindle or transmission shaft 12 is rotatably mounted in the bearing 7 and has a worm gear 13 permanently secured thereto and engaging the shoulder 6', and the upper end of said shaft, which terminated within the pocket 5, carries a disc or rotor 14 provided with a selectively placed driving pin 15.

The shaft has the lower end thereof contracted and provided with a flat face 16 (see Fig. 10) which is adapted to receive a complementary central opening 17' supplied in a driving disc 17, said disc being securely held in place by an applied washer 18 fastened by a screw 19 which screws into a central threaded opening 20 supplied in the lower end of the shaft. The latter disc is provided with a selectively placed peripheral notch 17×. Obviously by undoing the screw 19 one can easily and quickly remove the shaft with its attached parts.

The ends of the sleeve 2 are internally screw threaded to receive a screw plug 21 and a sleevelike bearing 22, the inner ends of both the plug and bearing being tapered off as best shown in Fig. 5. Both the sleeve and plug are supplied with nutlike heads 21' and 22' to facilitate mounting or demounting. The plug is centrally bored and the outer end of the bore is screw threaded to receive a small closure plug 23 having a squared outer end for wrench applying purposes.

The sleevelike bearing 22 has its outer end exteriorly screw threaded for a purpose later apparent and said sleeve rotatably receives a countershaft 24 on the inner end of which I have permanently mounted a worm gear 25, located between the inner ends of the plug 21 and the bearing sleeve 22. The gear 25 meshes with gear 13, the inner wall of the sleeve 6 being cut away to permit such, and obviously the contracted or tapered inner ends of the sleeve 22 and plug 21 serve to reduce gear friction at such points. The outer end of the countershaft terminates flush with the outer end of the sleeve 22 and the said shaft is centrally bored, as best shown at 24' in Figs. 3 and 5 and is supplied with a lengthwise extending slot 24² opening to the bore.

In a location opposite the worm gear 25, the sleeve 2 is supplied with a conventional grease cup 26 to receive grease for lubricating purposes, and to insure of effective lubrication of the worms and their shafts. The shoulder 6' has a small, horizontal pocket 27 (see Fig. 6) drilled therein which forms a by-pass to permit grease to pass from the reserved area 28 around the worm gear 25 and into a vertical grease slot 29 cut in the bearing 7.

It may be found in practice that through lack of mounting space, the grease cup cannot be left located in the position shown in the drawings. It can be readily shifted to a second position by interchanging the positions of the grease cup and the plug 23 and in such changed position grease clears to the interior parts through cross slots 30 (see Figs. 5 and 9) which I have supplied in the inner end of the screw plug 21.

The adapter above described, is especially designed for insertion between the existing and well known distributor and governor of a Ford gasoline engine such as are used in four and five ton trucks. Such distributors and governors are designated as models Q and QH and their detailed parts are clearly shown on page 315 of Ford Motor Company of Canada, Limited, illustrated parts catalogue.

The inserted adapter is used in conjunction with an instrument known to the trade as a tachograph and which instrument is usually mounted on the dash panel of the truck and is driven by a flexible driving cable.

When my adapter is used with the existing governor 31 and distributor 32, the clamp, such as that 33 used to secure the distributor to the governor, is removed temporarily and the distributor is lifted to allow of the insertion of my adapter with its disclike base 10 resting on the open top end of the governor casing 34 (see Fig. 11) and with its pocketed circular head 3 supporting the base of the distributor casing. A hole 35 (see Fig. 11) is drilled in the governor casing to receive the pin 10' of the adapter, such being provided for placement purposes. After the adapter has been put in place it is secured in position by applying the clamp 33 to fasten the distributor to the adapter and by using a second clamp 36 to secure the adapter to the governor. Both the existing governor and distributor are provided with exterior channels 37 and 38 for clamping purposes and the upper clamp 33 is caught in the upper channel 38 and that 4 of my adapter while the lower clamp is caught in the channel 37 of the governor and over the edge of the disclike base 10 of the adapter.

The governor embodies as part of its structure, a shaft 39 which is engine driven at one half engine speed and the upper end of such shaft has a disc governor secured thereto and the latter presents an eccentric driving pin 40 (see Figs. 11 and 12). When the distributor is mounted directly on the governor, the latter pin serves to drive a disc or plate 41 located in the lower end of the distributor, carried by the lower end of the distributor shaft 42 and supplied with a notch 43 (see Fig. 13) to receive the pin 40. When my adapter has been installed between the governor and the distributor, the pin 40 is entered in the notch 17ˣ of the disc 17 of my adapter and the pin 15 of the adapter is entered in the notch or slot 43 of the disc 41 of the distributor. Accordingly the shafts 39, 12 and 42 are all driven at the same speed which is one half engine speed.

At the present time tachographs, indicated at 44 in Figs. 14 and 15 are driven at a speed less than one half engine speed and which tachograph driven speed may vary in different makes of tachographs and it has been found necessary to employ a gear box with a selected gear ratio, so that a drive at one half engine speed will drive the particular make of tachograph at its correct speed for recording purposes, the drive being through the correcting gear box. Such a gear box, which is a commercial commodity, is indicated at 45 in Figs. 11 and 14.

In a governor and distributor assembly, Q and QH hereinbefore mentioned, it has heretobefore been totally impossible to use any of the conventional gear boxes 45 due to the positioning of the distributor and on such account my adapter has been devised. With it installed in the manner hereinbefore described, one can use it with or without a gear box 45, as conditions require, provided the ratio of the worm gears of the adapter is designed to suit the particular requirements of the installation.

In a case where the ratio of the worm gears 13 and 25 of my adapter is a 1:1 ratio and one already has a tachograph the rotor shaft of which has to be driven at a fixed speed (which may vary with different makes of tachographs), then the existing gear box 45 will be selected and employed having the correct gear ratio to drive the rotor shaft of the tachograph at its required correct speed. The gear box selected will be connected by a coupling nut 46 to the sleeve 22 and by a coupling nut 47 to a flexible drive cable 48 in turn connected to the rotor shaft of the tachograph 44.

In cases where my adapters are to be used with existing tachograph installations where the tachograph rotor shafts are all to be driven at the same speed, it is simply a matter of making the ratio of the worm gears 13 and 25 such that they will convert the driving speed of the driving shaft 12 into the correct speed at the countershaft 24 to drive the rotor shaft of the tachograph at its correct driven speed. Such an arrangement is shown in Fig. 15 where the coupling nut 47 is connected directly to the sleeve 22. In such a latter case and where the shaft 12 is driven at one half engine speed, and the tachograph requires to be driven at one third engine speed, then the ratio of the worm gears 13 and 25 will be .666:1, thus eliminating the necessity for a gear box 45.

What I claim as my invention is:

An adapter comprising an upstanding casing having a circular, pocketed upper end and a disclike base, a vertical transmission shaft rotatably mounted in the casing and having its upper end terminating within the pocket and its lower end extending beyond the disclike base, a driving disc secured to the lower end of the shaft, said disc having a recess formed therein for the reception of a pin, a rotor secured to the upper end of the shaft and provided with an upstanding, eccentric pin, said rotor and pin being within the pocket, a countershaft rotatably carried by and crossing the casing and intermeshed worm gears of predetermined gear ratio secured to the transmission shaft and the countershaft.

References Cited in the file of this patent

UNITED STATES PATENTS

| Number | Name | Date |
|---|---|---|
| 1,270,549 | Perrin | June 25, 1918 |
| 1,330,869 | Harter | Feb. 17, 1920 |
| 1,404,067 | Svenson | Jan. 17, 1922 |
| 1,487,499 | Whittington | Mar. 18, 1924 |
| 1,516,615 | Meile | Nov. 25, 1924 |
| 1,537,670 | Hammond | May 12, 1925 |
| 1,919,512 | Helgeby et al. | July 25, 1933 |
| 2,443,046 | Mansen | June 8, 1948 |